(Model.)
W. T. SMALL & H. H. WARNER.
SELF ADJUSTING ROD PACKING.
No. 356,014. Patented Jan. 11, 1887.
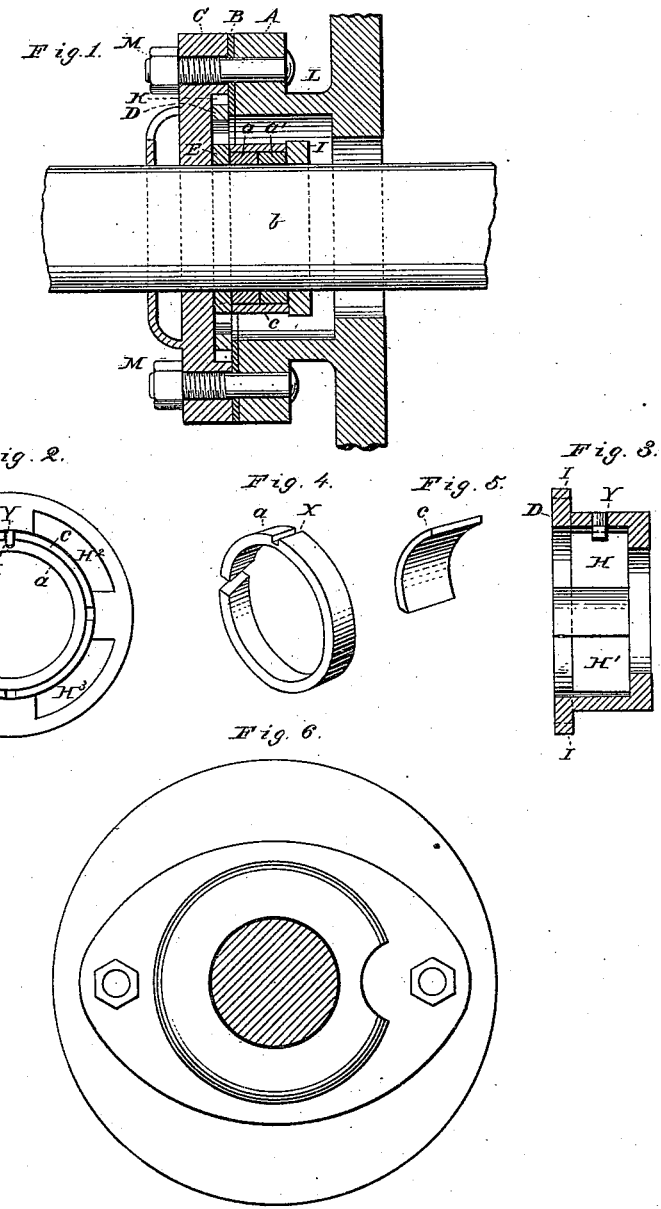
WITNESSES
INVENTORS
ATTORNEYS

United States Patent Office.

WILLIAM T. SMALL AND HENRY H. WARNER, OF TACOMA, WASHINGTON TERRITORY.

SELF-ADJUSTING ROD-PACKING.

SPECIFICATION forming part of Letters Patent No. 356,014, dated January 11, 1887.

Application filed September 7, 1886. Serial No. 212,936. (Model.)

*To all whom it may concern:*

Be it known that we, WILLIAM T. SMALL and HENRY H. WARNER, citizens of the United States, residing at Tacoma, in the county of Pierce and Territory of Washington, have invented certain new and useful Improvements in Self-Adjusting Piston-Rod and Valve-Stem Packing; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a section. Figs. 2, 4, and 5 are detail views. Fig. 3 is a cross-sectional view of the combined chuck-ring and ring-cage. Fig. 6 is a front view of the stuffing-box.

Our invention relates to piston-rod and valve-stem packing; and it consists in the construction and novel combination of parts, as hereinafter described, and pointed out in the claim.

Piston-rod and valve-stem steam-packing as heretofore constructed have depended upon screws or springs to force the rings wedge-like down against the piston-rod and out against the wall of the stuffing-box or cage inside of the stuffing-box, in which constructions there are two places to keep tight.

Our object is to pack against the rod, which we accomplish by stuffing up or closing the hole of the stuffing-box by means of a gasket or otherwise between the box and packing-gland, and introducing small metallic and cast-iron rings behind the gland, and admitting steam on the top or outside of the rings to press them down, thereby forming a self-adjusting steam-tight packing.

Only sufficient steam is admitted to force the rings down on the piston-rod to keep the steam in the cylinder on that part of the engine-stroke while working steam. At all other times the rings spring out and are free on the rod, relieving it of loss of power from friction and wear on the piston-rod and packing.

Referring by letter to the accompanying drawings, A designates the stuffing-box, and B designates a rubber gasket interposed between the stuffing-box A and the cast-iron packing-gland C, and also between the stuffing-box and the combined chuck-ring and ring-cage D.

$a$ $a'$ designate two metallic open or lap rings fitting on the piston-rod $b$, said rings $a$ $a'$ being surrounded by a sectional cast ring, $c$, made in four sections, which cover the joints in the metallic rings $a$ $a'$. These rings $a$ $a'$ and $c$ and a third and continuous ring, E, are held in place by the ring-cage D. The ring-cage D is, when the several parts are connected together, provided with openings H H' H² H³ around the sectional cast ring, to admit steam on the outside of the rings $a$ $a'$ and $c$ for the purpose of pressing said rings down on the piston-rod and preventing the steam from coming out of the cylinder during that part of the engine-stroke when the rings are pressed down.

The cage and rings are held in place by the flange I of the cage, which flange is let into a seat, K, in the packing-gland C, which is bolted securely to the head of the cylinder L by bolts M M. We also use springs to keep the rings from shaking around when the engine is moving and not using steam.

The open packing-rings $a$ $a'$ are provided in their outer peripheries with transverse grooves X, which permit them to pass the stop-pin Y, projecting inwardly from one of the arms of the ring-cage, said stop-pin Y serving to prevent the rings $a$ $a'$ from turning in the cage.

Having described this invention, what we claim, and desire to secure by Letters Patent, is—

The combination, with the stuffing-box, packing-gland, and piston-rod or valve-stem, of the combined chuck-ring and ring-cage D, provided with the stop-pin $y$, section-ring, the open rings $a$, provided with the transverse grooves in their outer peripheries, and the solid ring E, interposed between the packing-gland and said open rings, substantially as specified.

In testimony whereof we affix our signatures in presence of two witnesses.

WILLIAM T. SMALL.
HENRY H. WARNER.

Witnesses:
THEO. C. SENY,
JAS. M. ASHTON.